United States Patent [19]
Mott et al.

[11] 3,749,306
[45] July 31, 1973

[54] DAY CYCLE RESTORATION MECHANISM

[75] Inventors: Richard C. Mott, Harwood Heights; Milo R. Wentworth, Deerfield, both of Ill.

[73] Assignee: Honeywell Inc., Minneapolis, Minn.

[22] Filed: June 29, 1971

[21] Appl. No.: 158,006

[52] U.S. Cl. .................................. 236/47, 137/85
[51] Int. Cl. ...................................... G05d 23/185
[58] Field of Search ................... 137/84, 85, 463; 236/47

[56] References Cited
UNITED STATES PATENTS

| | | | |
|---|---|---|---|
| 3,212,710 | 10/1965 | Nilles | 236/47 |
| 3,305,172 | 2/1967 | Duchek et al. | 236/47 X |
| 3,386,465 | 6/1968 | Johnson | 137/463 |
| 3,455,319 | 7/1969 | Hogel | 137/85 |
| 1,619,500 | 3/1927 | Econopouly | 137/463 |

Primary Examiner—Alan Cohan
Assistant Examiner—Gerald A. Michalsky
Attorney—Lamont B. Koontz and Trever B. Joike

[57] ABSTRACT

A mechanism for use in a day-night pneumatic thermostat for temporarily establishing day operation during a period when the thermostat is normally in night operation, the mechanism comprising manually operable lever movable to block the flow of fluid through a passageway connected to a relay which controls the flow of fluid to the day and night temperature responsive elements.

10 Claims, 4 Drawing Figures

INVENTOR.
RICHARD C. MOTT
MILO R. WENTWORTH

[3,749,306]

DAY CYCLE RESTORATION MECHANISM

BACKGROUND AND SUMMARY OF THE INVENTION

This invention relates to a pneumatic thermostat and more particularly to a manually operable mechanism for use in a pneumatic thermostat which allows the temporary restoration of day operation of the thermostat when the thermostat would otherwise control for night operation.

There exists a need in many applications for the capability of restoring day operation during the nighttime. For example, in a school classroom, if there is to be a meeting in the evening, night operation of the thermostat will be unsatisfactory since the temperature is controlled to a lower setpoint and no ventilation is provided. Accordingly it is desirable to restore daytime operation for the particular classroom without disrupting the nightime control of the remainder of the building.

There are a number of mechanisms currently in use which provide for such day cycle restoration. The subject mechanism, however, provides a particularly simple and reliable mechanism for day operation restoration and in addition has the capability of providing control of an auxiliary device such as a pressure to electric switch for operation of a fan or the like.

The preferred embodiment of the mechanism comprises a manually movable lever, a pivot point about which the lever may pivot, a pressure responsive means, and a valve. When the lever is appropriately positioned, the pressure responsive means urges the lever to pivot and thereby engage the valve closure means of the valve which thereby closes the valve. The closing of this vlave interrupts the flow of fluid through a passageway which is connected between a pressure source and a relay or switch which controls the flow of fluid to day and night flow through the passageway to the relay results in the relay switching over and diverting the flow of fluid from the night temperature responsive element to the day temperature responsive element whereby day operation is resumed.

DETAILED DESCRIPTION OF THE INVENTION

Figure 1:
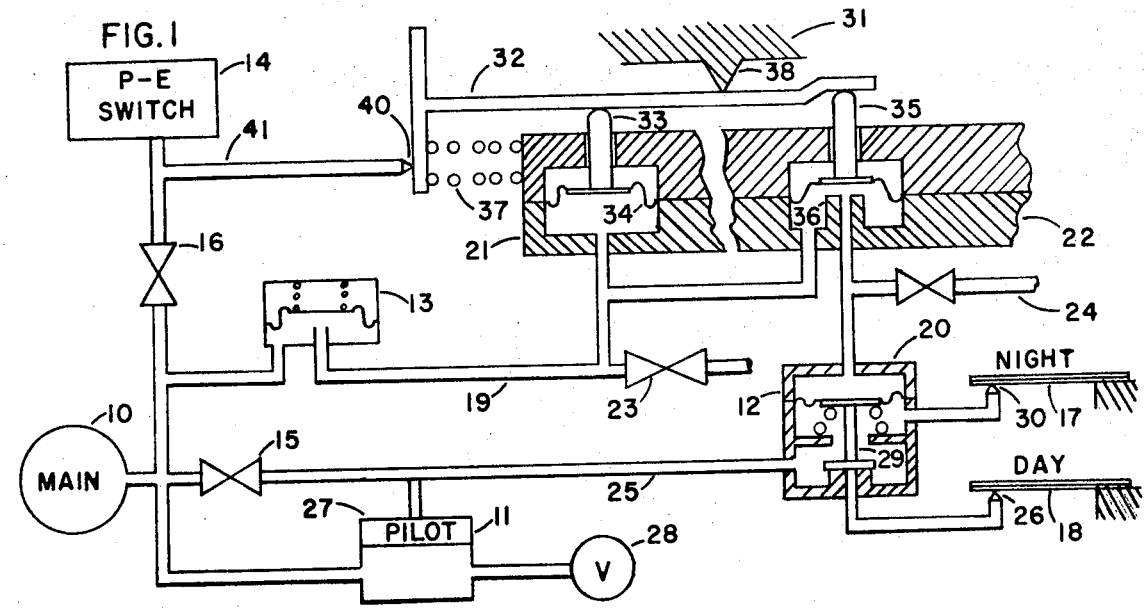
FIG. 1 is a schematic illustration of a pneumatic thermostatic system incorporating the inventive day cycle restoration mechanism.

FIG. 1 is a schematic illustration of a pneumatic thermostatic system. The system is connected to a main pressure source 10 capable of providing two pressures, for example, 16 psi corresponding to day operation, and 21 psi corresponding to night operation. Also connected to the main pressure source via appropriate conduits are an air flow amplifier 11, a relay 12, a biased valve means 13, and a pressure to electric or P-E switch 14. Interposed in the conduits between the main pressure source 10 and the relay 12 and between the main pressure source 10 and the P-E switch 14 are restrictions 15 and 16. The biased valve means 13 is spring biased closed and arranged to remain closed during day operation when the main pressure is 16 psi and to be open during night operation when the main pressure is 21 psi.

Associated with the relay 12 are two temperature responsive elements or bimetals 17 and 18. The relay 12 is spring biased so that pressure is normally transmitted from the main pressure source to temperature responsive element 18 which is the day element.

Numeral 19 designates a passageway interconnecting the main pressure source 10 and chamber 20 of the relay 12. Connected to passageway 19 is biased valve means 13, pressure responsive means 21, and valve means 22. Connected to passageway 19 downstream of biased valve means 13 but upstream of pressure responsive means 21 is a restricted bleed 23. A second restricted bleed 24 is connected to passageway 19 downstream of valve means 22.

During day operation valve means 13 is closed so that passageway 19 is bled down to or near atmospheric pressure, as is chamber 20 of relay 12. Accordingly fluid flow from the main pressure source is transmitted through conduit 25, through relay 12, to nozzle 26 associated with day element 18. The position of temperature responsive element 18 establishes a pressure in conduit 25 indicative of the temperature of the space wherein element 18 is located. This pressure is communicated to the pilot chamber 27 of air flow amplifier 11. The pressure in the pilot chamber of air flow amplifier 11 establishes the flow of main pressure through the air flow amplifier to a valve 28 which controls the flow of a suitable medium such as hot water or the like for altering the temperature of the space.

During night operation biased valve means 13 is open so that main pressure is transmitted through passageway 19 to chamber 20 of relay 12. Pressure in chamber 20 causes the spool member 29 to move downwardly so that fluid flow through passage 25 is diverted to nozzle 30 associated with night element 17. Night operation is thereby established.

The day restoration mechanism is generally indicated by the numeral 31. The mechanism comprises a manually movable lever 32, a guide means or pivot means 38, pressure responsive means 21, and valve means 22. The pressure responsive means 21 comprises a pin 33 associated with a diaphragm 34 which is subject to the pressure in passageway 19. The valve means 22 comprises a valve closure member 35 and a valve seat 36. The lever means 32 is manually movable between first and second positions, the first position shown in FIG. 1 and the second position shown in FIG. 2. A spring 37 biases the lever means towards the first position.

If the main pressure is at 21 psi so that the thermostatic system is in night operation, and if it is desired to temporarily restore day operation, the lever means 32 is manually moved from its first position to its second position. Moving the lever means 32 in this manner results in the camming or otherwise forcing down of valve closure member 35 against the valve seat 36, and thereby, the closing off of passageway 19 to chamber 20 of the relay or switch 12. Pressure in chamber 20 is bled down through restricted bleed 24 and the relay thereupon diverts fluid flow from the night nozzle 30 to the day nozzle 26 as described above.

The lever means 32 is arranged to coact with or pivot about the guide or pivot means 38. Although only a single guide or pivot means 38 is shown, several such means may be incorporated so that the action of the lever in forcing down valve closure member 35 is more a pure camming action instead of a hybrid camming and pivoting action.

When moved to its second position, the lever means is urged by the pin 33 of pressure responsive means 21 to pivot about the pivot means 38 to thereby exert a force downwardly on valve closure means 35. The force exerted on the lever means 32 by the pin 33 is sufficient to frictionally retain the lever means in the second position; that is, upon manually moving the lever means from the first position to the second position, the lever means remains in the second position unassisted. If desired, night operation may be resumed by manually moving the lever means back to its first position. On the other hand if no action is taken, the lever means will automatically resume its first position when day operation is automatically resumed. This occurs as follows: at some predetermined time, the main pressure source will provide a pressure of 16 psi instead of the night pressure of 21 psi; this reduced pressure will result in biased valve means 13 going closed; upon the closure of biased valve means 13, the pressure in passageway 19 downstream of biased valve means 13 will bleed down through restricted bleed 23; when the pressure in passageway 19 bleeds down the pin 33 of pressure responsive means 21 will drop and the biasing spring 37 will cause the lever 32 to return to its first position.

Figure 2:
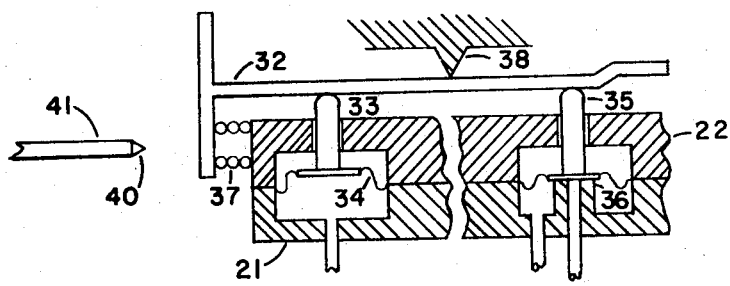
FIG. 2 is a schematic illustration of the mechanism as it appears when day operation is resumed.

Associated with lever means 32 is a nozzle 40 which is connected to P-E switch 14 and the main pressure source 10. When the lever means 32 is in its first position, the nozzle 40 is substantially closed off by the lever 32. On the other hand when the lever 32 is moved to its second position as shown in FIG. 2, the pressure in conduit 41 is allowed to bleed to atmosphere through nozzle 40 so that the pressure transmitted to the P-E switch 14 goes substantially to zero. The P-E switch, which may be connected to a fan or the like, is arranged to actuate such fan when subjected to a pressure at or near zero. Accordingly when day operation is restored by moving the lever 32 to its second position, the P-E switch is automatically actuated to a position capable of turning a fan or the like on.

Figure 3:
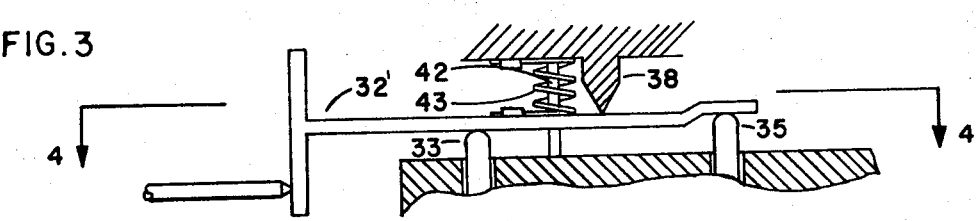
FIG. 3 is a schematic illustration of an alternative embodiment of the mechanism.
Figure 4:
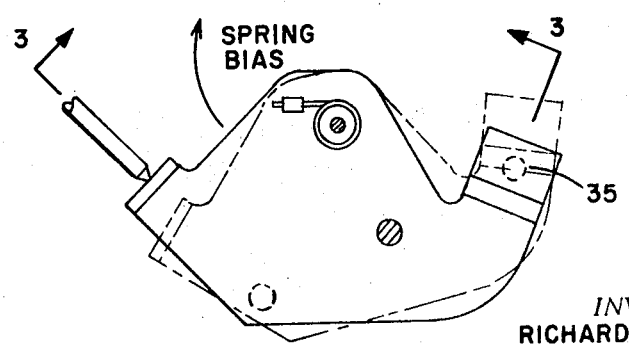
FIG. 4 is a top view of the alternative embodiment of the day cycle restoration mechanism illustrated in FIG. 3.

FIGS. 3 and 4 illustrate an alternative embodiment of the day cycle restoration mechanism illustrated in FIGS. 1 and 2. In FIGS. 3 and 4 the lever means 32' is rotatably movable from its first position, shown in solid lines in FIG. 4, to its second position, shown in dotted lines in FIG. 4. The lever means 32' is biased towards its first position by a torsion spring 43 which encircles post 42, about which lever 32' rotates. When pressure responsive means 21 is subject to pressure, and when lever 32' is moved to its second position, pin 33 urges the lever to pivot and thereby urges valve closure member 35 against valve seat 36. Again, the force exerted by the pin on the lever is sufficient to frictionally bind the lever in the second position until it is manually returned to its first position or normal day operation is automatically resumed.

While the inventive day restoration mechanism has been described within the context of a pneumatic thermostat in a two pressure pneumatic system, it is intended that the invention be limited only by the scope of the appended claims.

The embodiments of the invention in which an exclusive property or right is claimed are defined as follows:

1. In a pneumatic condition responsive device having a fluid passageway, means for manually interrupting the flow of fluid through the passageway comprising: guide means;
   manually movable lever means movable between first and second positions;
   first means responsive to pressure in the fluid passageway and arranged to engage the lever means to urge the lever means to coact with the guide means; and,
   valve means located in the fluid passageway downstream of the first means including a valve seat and valve closure means;
   the manually movable lever means being arranged to be substantially disengaged with the valve closure means when the lever means is in the first position and to be engaged with the valve closure means when the lever means is in the second position; the first means, lever means, valve closure means, and guide means being constructed and arranged so that when the lever means is in the second position, the lever means forces the valve closure means against the valve seat to thereby close the valve means, the lever means being frictionally retained in the second position so long as the first means is subject to pressure in the fluid passageway.

2. The invention according to claim 1 further comprising biasing means for biasing the lever means toward the first position.

3. The invention according to claim 1 wherein the fluid passageway is supplied with fluid from a two level pressure source, the invention further comprising:
   biased valve means located in the fluid passageway upstream of the first means and arranged to be closed when the pressure in the fluid passageway is at the first level and to be open when the pressure in the fluid passageway is at the second level.

4. The invention according to claim 3 further comprising relay means connected to the fluid passageway downstream from the valve means, the means for manually interrupting the flow of fluid through the passageway arranged to interrupt the flow of fluid to the relay means when the pressure in the fluid passageway is at the second level.

5. The invention according to claim 4 further comprising first and second restricted bleed means, the first restricted bleed means connected to the fluid passageway between the biased valve means and the first means, the second restricted bleed means connected to the fluid passageway between the valve means and the relay means.

6. In a day-night pneumatic thermostat adapted to be connected to a two level pressure source, the first level for establishing day operation and the second level for establishing night operation, the thermostat having first and second condition responsive elements and relay means for controlling the flow of fluid to the elements, means for temporarily establishing day operation during the night, comprising:
   a fluid passageway between the pressure source and the relay means;
   valve means including a valve seat and valve closure means, located in the fluid passageway;
   pressure responsive means connected to the fluid passageway and responsive to the fluid pressure in the fluid passageway;
   pivot means;
   manually movable lever means pivotable about the pivot means and arranged to be movable to engage the valve closure means and to be engaged and urged by the pressure responsive means to pivot about the pivot means and thereby urge the valve closure means against the valve seat, whereby fluid flow between the pressure source and the relay means is interrupted and day operation effected.

7. The invention according to claim 6 wherein the pressure responsive means, lever means, pivot means, and valve closure means are constructed and arranged so that when the lever means is engaged with the valve closure means, the lever means is frictionally retained in such engagement so long as the pressure responsive means is subject to pressure in the fluid passageway.

8. The invention according to claim 7 wherein the lever means is rotatably movable and is spring biased towards disengagement with the valve closure means.

9. The invention according to claim 8 further comprising biased valve means located in the fluid passageway upstream from the pressure responsive means and arranged to be closed when the pressure provided by the pressure source is at the first level, and to be open when the pressure is at the second level.

10. The invention according to claim 9 further comprising first and second restricted bleed means, the first restricted bleed means connected to the fluid passageway between the biased valve means and the pressure responsive means, the second restricted bleed means connected to the fluid passageway between the valve means and the relay means.

* * * * *